Sept. 12, 1967     E. KOMENDA     3,341,214
WINDOW-WASHING RESERVOIR INSTALLATION FOR MOTOR VEHICLES
Filed April 2, 1965

INVENTOR
Erwin KOMENDA
By Dicke & Craig
ATTORNEYS 3,341,214
WINDOW-WASHING RESERVOIR INSTALLA-
TION FOR MOTOR VEHICLES
Erwin Komenda, Stuttgart, Germany, assignor to Firma
Dr. Ing. h.c. F. Porsche KG, Stuttgart-Zuffenhausen,
Germany
Filed Apr. 2, 1965, Ser. No. 444,959
Claims priority, application Germany, Apr. 4, 1964,
P 33,975
10 Claims. (Cl. 280—5)

ABSTRACT OF THE DISCLOSURE

The present disclosure relates to a window washing installation for motor vehicles, especially rear engine motor vehicles wherein the fuel tank is disposed in the front of the motor vehicle along with the luggage compartment. The fuel tank and liquid reservoir for the window washing installation are disposed closely adjacent to each other, preferably form lockingly interconnected, and accessible through a filling opening that is separate from and independent of the normal luggage compartment opening and engine compartment opening. Preferably, this separate opening is in the front fender and is provided with a cover.

---

Figure 1:
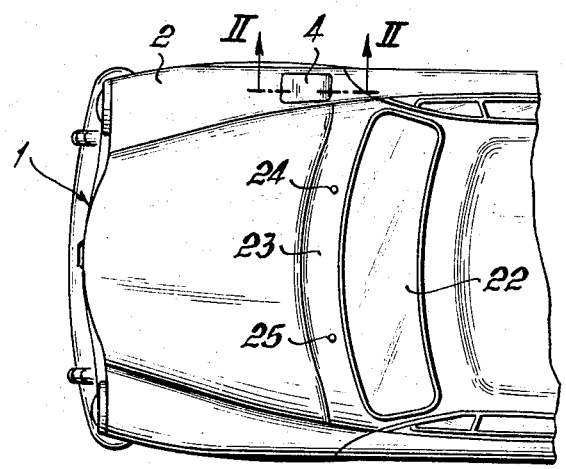

Because it is expedient to locate the windshield washing unit as close to the vehicle windshield as possible, it is known to provide the liquid container or reservoir for such a unit either in the engine compartment for the normal front engine vehicles or in the luggage compartment of the motor vehicle for rear engine vehicles wherein the luggage compartment is located under the hood in front of the windshield. Of course, in certain cases of front engine vehicles where space is at a premium close to the windshield, it is also known to locate the window-washing reservoir at a point remote from the windshield in the rear luggage compartment.

When the arrangement and provision is made in this manner, each check of the liquid level in the liquid tank or container necessitates that the hood of the motor vehicle be opened. Additionally, when the liquid container is refilled, any overflowing or spilled washing liquid can soil pieces of luggage or other items contained in the luggage compartment.

In order to eliminate this drawback, it has already been proposed that the liquid container be provided with an extensible inlet feed pipe; but the manipulation of the latter has been found to be rather complicated, and such does not always eliminate the need to raise the hood of the vehicle each time the reservoir is filled.

These disadvantages are eliminated, in accordance with the present invention, by securing the liquid container or reservoir for the window-washing unit to the fuel tank of the motor vehicle so as to be accessible by way of the opening provided in the automobile body provided for the inlet feed pipe of the fuel tank. This arrangement, apart from affording a practical accommodation, also makes it possible that the liquid container may be served in a simple manner since it can be checked and, respectively, filled up without prior opening of the hood covering the engine compartment, and/or the lid of the luggage compartment of the motor vehicle. At the same time, any soiling of the luggage compartment by overflowing washing liquid is made impossible.

Since the liquid container is directly supported by and rests against the fuel tank, special supporting elements which render the unit expensive are unnecessary. In order to guarantee a firm, secure support of the liquid container or reservoir with respect to the fuel tank, the cooperating surfaces of the reservoir and the tank are provided with complementary arcuate surfaces. The liquid container or reservoir and/or the fuel tank are also provided with abutment surfaces which eliminate any rolling or oscillating movements of the liquid container with respect to the fuel tank and additionally serve for relieving the fastening elements of the liquid container from excessive forces.

The liquid container is held at the fuel tank by means of a readily releasable connection, for example, a clamping strap. In this manner, the liquid cotnainer can be removed easily and rapidly in case of any necessary cleaning or repair work. The liquid container or tank is held at the inlet feed pipe of the fuel tank so that any additional holding or attaching points at the fuel tank, which could possibly reduce the stability thereof, are unnecessary.

It is an object of the instant invention to provide a window-washing installation or unit which avoids or otherwise eliminates all of the foregoing problems relating to prior art constructions.

It is another object of the instant invention to provide a window-washing installation or unit wherein the reservoir is secured advantageously to the fuel tank of the vehicle so as to be accessible from the opening in the vehicle body provided for the inlet feed pipe of the fuel tank.

It is still another object of the instant invention to provide a window-washing installation or unit wherein the reservoir is secured to the fuel tank of the vehicle in a very simple manner and is provided with means integral with the body thereof to insure a secure, relatively movable support on said fuel tank.

It is a further object of the instant invention to provide a window-washing installation or unit having a reservoir which is accessible without opening or raising the vehicle hood or trunk lid and which is located outside of the vehicle engine or luggage compartment.

Figure 2:
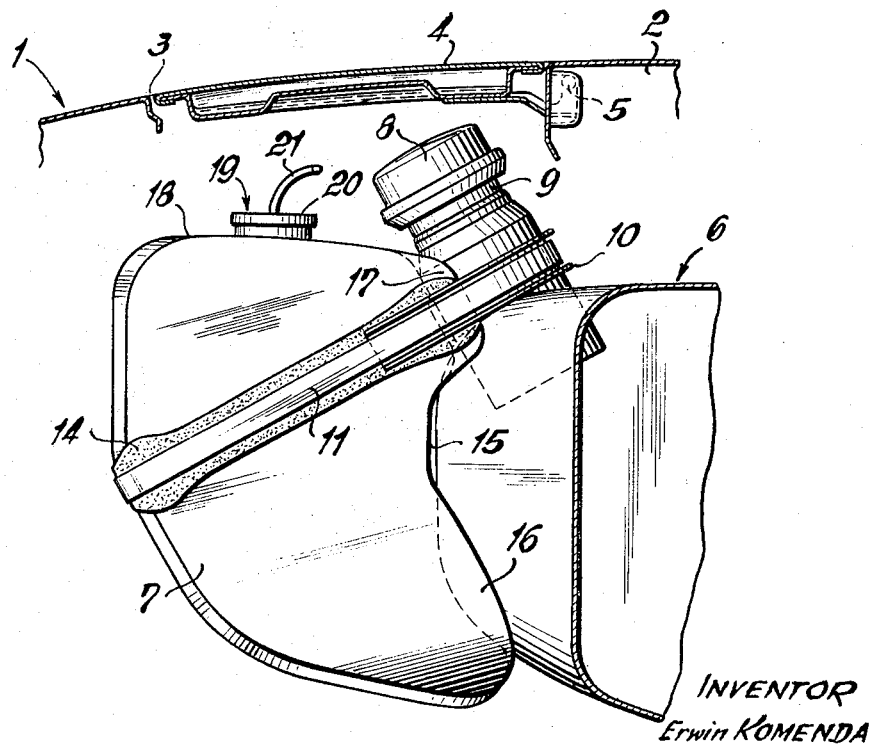

These and other objects, features and advantages of the instant invention will be made clearer by the following detailed description of one embodiment of the invention when taken in conjunction with the accompanying drawing, wherein FIGURE 1 is a top plan view of the front part of a motor vehicle, and FIGURE 2 is a cross-sectional view along line II—II of FIGURE 1.

Looking now to the drawing, an opening 3 is disposed in the body 1 of a motor vehicle in the area or region of a front fender 2. The opening 3 is closed in the well-known manner by means of a lid 4 which is pivotally positioned at the body 1 through the intermediary action of a hinge 5. A fuel tank 6 as well as a liquid container or reservoir 7 of a window-washing installation or unit are made accessible via the opening 3.

The fuel tank 6 includes the normal inlet feed pipe 9 provided with a closure cap 8. An essentially U-shaped sheet metal support member 10 is positioned around the inlet feed pipe 9 and serves to guide or support a clamping strap 11, which extends around the two leg portions of the U-shaped member 10 mounted on the inlet feed pipe 9 of the fuel tank 6, as well as through the intermediary action of a resilient base or gasket member 14, around the liquid container 7 of the window-washing unit and retains the same in position at the inlet feed pipe 9. In order to eliminate any rolling movements of the liquid container 7 with respect to the fuel tank 6, the surface 15 of the container 7 has projecting surface portions 16 and 17 which partially enclose or grip the fuel tank 6 and, respectively, the inlet feed pipe 9 thereof. The configuration of these surfaces provides a form-locking contact between the reservoir and the tank.

The liquid container or reservoir 7 is provided with an opening 19 at the side 18 thereof which faces the lid 5, and this opening 19 is provided with a closure 20 and leads from the container 7 by way of a pump (not shown) to the nozzles 24 and 25 (FIGURE 1) of the window-washing unit or installation which are disposed in front of the windshield 22 at the normally provided air inlet vent 23.

It should be apparent from the above description that the invention provides a window-washing installation or unit wherein the reservoir is located at a very accessible location outside of the vehicle engine or luggage compartments so that possible damage to items in the luggage compartment is avoided and access to the reservoir may be obtained without raising or opening the trunk lid or hood of the vehicle.

While I have shown and described one embodiment in accordance with the present invention, it is understood that the same is not limited thereto but is susceptible to numerous changes and modifications within the spirit and scope thereof and I therefore do not wish to be limited to the details shown and described herein but intend to cover all such changes and modifications as are encompassed by the scope of the appended claims.

I claim:

1. In a motor vehicle having a vehicle body, a fuel tank means including an inlet feed pipe therefor, an opening in said vehicle body providing access to said inlet feed pipe, and a window-washing installation, the improvement essentially consisting of liquid reservoir means for said window-washing installation supported on said fuel tank and accessible through said opening in said body, releasable securing means for firmly and securely mounting said liquid reservoir means on said fuel tank means in an easily removable manner, said releasable securing means including a clamping strap, a guide support member mounted on said feed pipe and a gasket member mounted on said reservoir means with said clamping strap mounted around both said guide support member and said gasket member.

2. In combination with a motor vehicle having a vehicle body, a fuel tank, an inlet feed pipe for the fuel tank, an engine compartment with an access opening and cover, a luggage compartment with an access opening and cover, a filling opening in said vehicle body providing access to said inlet feed pipe, and a window-washing installation, the improvement comprising: a liquid reservoir for said window-washing installation mounted closely adjacent to said fuel tank and having a filling inlet mounted to be accessible through said filling opening; said filling opening being separate from and independent of said engine compartment and luggage compartment openings; and a cover for said filling opening.

3. The combination of claim 2, wherein said liquid reservoir is releasably secured directly to said fuel tank.

4. The combination of claim 3, wherein said liquid reservoir and said fuel tank are each provided with arcuate form-locking contact surface means for preventing relative movement therebetween.

5. The combination of claim 4, wherein said fuel tank is mounted on said vehicle body and said liquid reservoir is mounted on said inlet feed pipe.

6. The combination of claim 5, wherein said engine compartment is located in the rear of said vehicle body, and said luggage compartment is located in the front of said vehicle body; said vehicle body having front fenders; said filling opening extending through one of said front fenders.

7. The combination of claim 2, wherein said liquid reservoir and said fuel tank are each provided with arcuate form-locking contact surface means for preventing relative movement therebetween.

8. The combination of claim 2, wherein said engine compartment is located in the rear of said vehicle body, and said luggage compartment is located in the front of said vehicle body; said vehicle body having front fenders; said filling opening extending through one of said front fenders.

9. The combination of claim 2, wherein said fuel tank is secured to said vehicle body and said liquid reservoir is releasably secured directly to said inlet feed pipe of said fuel tank.

10. The combination of claim 3, wherein said engine compartment is located in the rear of said vehicle body, and said luggage compartment is located in the front of said vehicle body; said vehicle body having front fenders; said filling opening extending through one of said front fenders.

References Cited

UNITED STATES PATENTS

| 1,504,751 | 8/1924 | Green | 280—5 |
| 2,114,558 | 4/1938 | Dismukes | 239—284 X |
| 2,131,306 | 9/1938 | Walker | 280—5 |
| 2,306,778 | 12/1942 | Carney | 239—284 X |
| 2,563,981 | 8/1951 | Walker | 280—5 |
| 3,237,868 | 3/1966 | Lovell | 239—284 |

FOREIGN PATENTS

| 1,123,544 | 6/1956 | France. |
| 566,550 | 9/1957 | Italy. |

LEO FRIAGLIA, *Primary Examiner.*